United States Patent [19]
Saitoh et al.

[11] Patent Number: 5,652,423
[45] Date of Patent: Jul. 29, 1997

[54] NON-CONTACTING RF-ID CARD FOR WIDE VOLTAGE RANGE INPUT

[75] Inventors: Shoshichi Saitoh; Masahiro Fujimoto; Katsuhisa Orihara; Susumu Yanagibori, all of Tochigi, Japan

[73] Assignee: Sony Chemicals Corporation, Tochigi, Japan

[21] Appl. No.: 491,077

[22] Filed: Jun. 16, 1995

[30] Foreign Application Priority Data

Jun. 21, 1994 [JP] Japan .................................. 6-138847

[51] Int. Cl.⁶ .................................................. G06K 19/06
[52] U.S. Cl. .......................... 235/492; 235/451; 235/439; 235/449; 902/26
[58] Field of Search .............................. 235/491, 492, 235/487, 451, 439, 449; 902/26

[56] References Cited

U.S. PATENT DOCUMENTS

| | | | |
|---|---|---|---|
| 3,641,462 | 2/1972 | Fujimura | 331/117 R |
| 3,969,678 | 7/1976 | Asahara et al. | 328/167 |
| 4,650,981 | 3/1987 | Foletta | 235/492 X |
| 4,814,595 | 3/1989 | Gilboa | 235/492 |
| 4,837,556 | 6/1989 | Matsushita et al. | 340/310 R |
| 5,434,396 | 7/1995 | Owen et al. | 235/449 X |
| 5,502,295 | 3/1996 | Owen et al. | 235/449 X |

*Primary Examiner*—Donald T. Hajec
*Assistant Examiner*—Michael G. Lee
*Attorney, Agent, or Firm*—Jay H. Maioli

[57] ABSTRACT

A battery-free non-contacting information card of a relatively simple arrangement which prevents an IC chip or the like from being destroyed by an excess voltage. This non-contacting information card includes a resonance circuit (3) for receiving a carrier signal (e.g., FSK signal) modulated on the basis of information supplied from a card reader/writer (2), an information processing system (5), (6), (7) for obtaining information from the carrier signal and a rectifier system (13) for obtaining a voltage by rectifying the carrier signal, wherein the non-contacting information card can be operated by the voltage obtained at the output side of the rectifier circuit (13). The resonance circuit (3) includes a variable capacitive element (3d). A resonance frequency of the resonance circuit (3) is varied by varying the capacity value of the variable capacitive element (3d) in response to the voltage value obtained at the output side of the rectifier circuit (13) to thereby make the voltage value obtained at the output side of the rectifier circuit (13) substantially constant.

1 Claim, 3 Drawing Sheets

NON-CONTACTING RF-ID CARD FOR WIDE VOLTAGE RANGE INPUT

BACKGROUND OF THE INVENTION

The present invention relates to a non-contacting information card for use as commuter's tickets, management cards for animals and lift tickets for a skiing ground and which can transmit and receive information to and from a card reader/writer by radio waves.

Non-contacting information cards which can transmit and receive information, such as identification (ID) number, due data and the number of times, between it and a card reader/writer via radio waves have recently been used as commuter's tickets, management cards for animals and lift tickets for a skiing ground, for example.

While the non-contacting information cards have heretofore been operated by a battery, in order to reduce the thickness of the non-contacting information card and to facilitate the management of the non-contacting information card, proposed non-contacting information cards are not operated by batteries but they can be operated by a voltage which results from rectifying a carrier signal used to transmit information from the card reader/writer.

FIG. 1 of the accompanying drawings shows an example of an information card system using a non-contacting information card which is not operated by a battery. This information card system will be described below with reference to FIG. 1.

As shown in FIG. 1, fundamentally, the information card system is composed of a non-contacting information card 1 and a card reader/writer 2 for transmitting and receiving information between it and the non-contacting information card 1 via radio waves.

As shown in FIG. 1, the card reader/writer 2 includes a main control unit 21 consisting of a CPU (central processing unit), a signal input terminal 22, a signal controller 23, a data buffer RAM (random-access memory) 24 and a high-order interface controller 25. Transmission information from the main control unit 21 is supplied through a PS/SP (parallel-to-serial/serial-to-parallel) converter 26 which converts information supplied thereto in the parallel to serial form to a FSK (frequency shift keying) modulator 27.

The FSK modulator 27 sets a frequency $f_1$ to 320 kHz, for example, when a digital signal is at high "1" level and sets a frequency $f_2$ to 280 kHz, for example, when the digital signal is at low "0" level. The card reader/writer 2 shown in FIG. 1 further includes a reference oscillator 28 and a frequency divider 29 which divides a reference signal supplied thereto from the reference oscillator 28 to obtain the signals with the frequencies $f_1$ and $f_2$.

An output signal from the FSK modulator 27 is supplied through a low-pass filter (LPF) 30 and an amplifier (AMP) 31 to a coil 32 which forms a write head.

As shown in FIG. 1, the card reader/writer 2 further includes a coil 33 that forms a read head. An ASK (amplitude shift keying) signal obtained at the coil 33 is supplied through a band-pass filter (BPF) 34 to an ASK demodulator 35. A demodulated signal from the ASK demodulator 35 is converted in the form of serial-to-parallel data by the PS/SP converter 26 and then supplied to the main control unit 21.

Further, a voltage from a commercially-available power source is supplied to an AC input terminal 36. The voltage from the commercially-available power source supplied to the AC input terminal 36 is supplied to a power supply unit 37. The power supply unit 37 supplies a regulated DC voltage which is used as an operation voltage to operate the card reader/writer 2.

The non-contacting information card 1 includes a resonance circuit 3 having a resonance frequency $f_0$ of 300 kHz, for example, for reading out the FSK signal supplied thereto from the coil 32 constructing the write head. The FSK signal from the resonance circuit 3 is supplied through a bandpass filter (BPF) 4 to a FSK demodulator 5. Information provided in the form of a digital signal obtained at the output side of the FSK demodulator 5 is supplied through a PS/SP converter 6, which converts the information in the form of serial-to-parallel data, to a main control unit 7 formed of a CPU.

The main control unit 7 supplies a memory 8 with data, such as a read command signal and a memory information signal. Therefore, data is written in or stored data is read out signal from the data memory 8 under the control of the main control unit 7.

The digital signal, which is the information signal read out from the data memory 8, is supplied to the main control unit 7. The digital signal, which is the information signal read out from the data memory 8 under the control of the main control unit 7, is converted in the form of parallel-to-serial data by the PS/SP converter 6 and then supplied to an ASK modulator 9. The non-contacting information card 1 further includes an oscillator 10 which supplies a carrier signal having a frequency $f_3$, e.g., 300 kHz to the ASK modulator 9.

An ASK signal of the information signal obtained at the output side of the ASK modulator 9 after the information signal has been read out from the data memory 8 is supplied through an amplifier (AMP) 11 to a coil 12 which transmits the ASK signal to the coil 33 constructing the read head of the card reader/writer 2 in an electromagnetic coupling way.

In the example shown in FIG. 1, the FSK signal received by the resonance circuit 3 is supplied to a rectifier 13 and a DC voltage obtained at the output side of the rectifier 13 is used as an operation voltage to operate the non-contacting information card 1.

According to the non-contacting information card 1, since the non-contacting information card is not provided with the battery, it can be reduced in thickness and becomes useful from an administration standpoint.

A power for driving the non-contacting information card 1 is transmitted from the card reader/writer 2 in the form of electromagnetic wave. Therefore, if a positional relationship between the resonance circuit 3 and the coil 32 which constructs the write head of the card reader/writer 2 is always constant, then a voltage induced in the resonance circuit 3 becomes always constant.

However, in actual practice, when the non-contacting information card 1 is in use, the non-contacting information card 1 can be moved in a predetermined area that is provided as an operation area in which the non-contacting information card 1 can come near or away from the coil 32 constructing the write head of the card reader/writer 2. The non-contacting information card 1 can be located randomly within this operation area. Therefore, when the non-contacting information card 1 is located nearest the coil 32 of the card reader/writer 2, an excess voltage is induced in the resonance circuit 3 of the non-contacting information card 1 so that the rectifier 13 outputs an excess voltage. Thus, in worst cases, there is then the risk that an IC (integrated circuit) chip or the like disposed in the non-contacting information card 1 will be destroyed by the excess voltage.

In order to prevent the IC chip or the like from being destroyed by the excess voltage, it is proposed that the non-contacting information card 1 incorporates a constant voltage controller of a serial control type in association with the rectifier 13 to dissipate an excess voltage as a heat when the output voltage of the rectifier 13 increases in excess of a predetermined value.

However, in this case, the constant voltage controller which treats the excess voltage as a heat is considerably complicated in circuit arrangement and also occupies a relatively large area of the IC chip of the non-contacting information card 1. As a consequence, the non-contacting information card becomes expensive.

SUMMARY OF THE INVENTION

In view of the aforesaid aspect, it is an object of the present invention to provide a non-contacting information card of a relatively simple arrangement in which an IC chip or the like can be prevented from being destroyed by an excess voltage.

It is another object of the present invention to provide a non-contacting information card which can be made inexpensive.

According to an aspect of the present invention, there is provided a non-contacting information card including a resonance circuit for receiving a carrier signal modulated on the basis of information supplied thereto from a card reader/writer, information processing means for obtaining information from the carrier signal and a rectifier means for rectifying the carrier signal to provide a voltage, the non-contacting information card being operated by the voltage obtained at the output side of the rectifier means. This non-contacting information card is comprised of a variable capacitive element provided in the resonance circuit, wherein a resonance frequency of the resonance circuit is varied by varying a capacitive value of the variable capacitive element in response to a voltage value of the output side of the rectifier means thereby to make the voltage value of the output side of the rectifier means substantially constant.

According to another aspect of the present invention, in the non-contacting information card, the variable capacitive element is formed of a vari-cap diode and the vari-cap diode is reversely biased by a voltage obtained at the output side of the rectifier means.

According to the present invention, the voltage obtained in the resonance circuit by the electromagnetic coupling increases so that, when the power supply voltage obtained at the output side of the rectifier means increases, the capacity value of the variable capacitive element changes, e.g., decreases and the resonance frequency of the resonance circuit changes, e.g., increases. Therefore, the voltage that is obtained in the resonance circuit by the electromagnetic coupling decreases, making it possible to make the power supply voltage obtained at the output side of the rectifier means substantially constant.

DETAILED DESCRIPTION OF THE PREFERRED EMBODIMENT

A non-contacting information card according to an embodiment of the present invention will hereinafter be described with reference to FIGS. 2 and 3. In FIG. 2, like parts corresponding to those of FIG. 1 are marked with the same references and therefore need not be described in detail.

Figure 1:
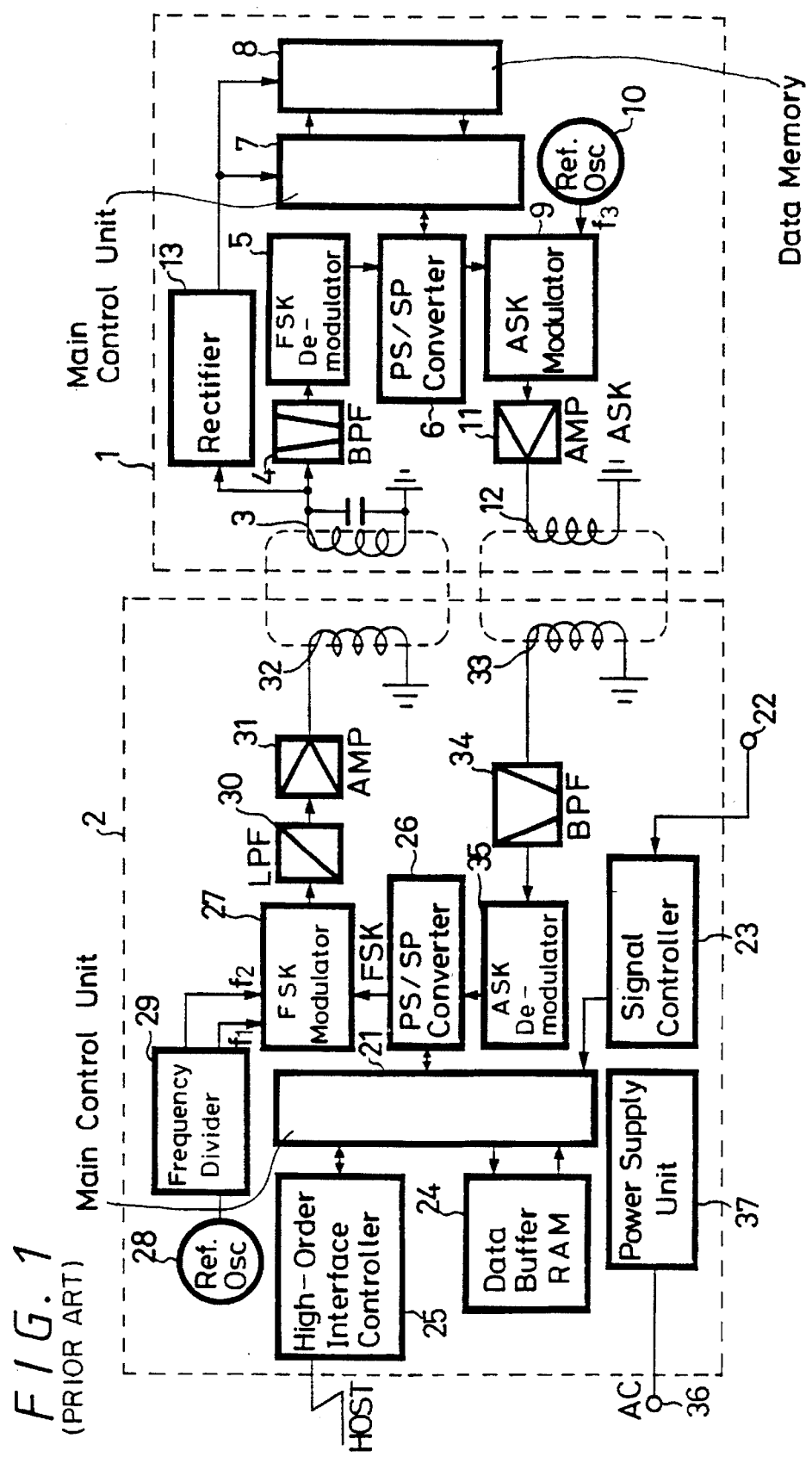
FIG. 1 is a schematic block diagram showing an information card system which uses a non-contacting information card.
Figure 2:
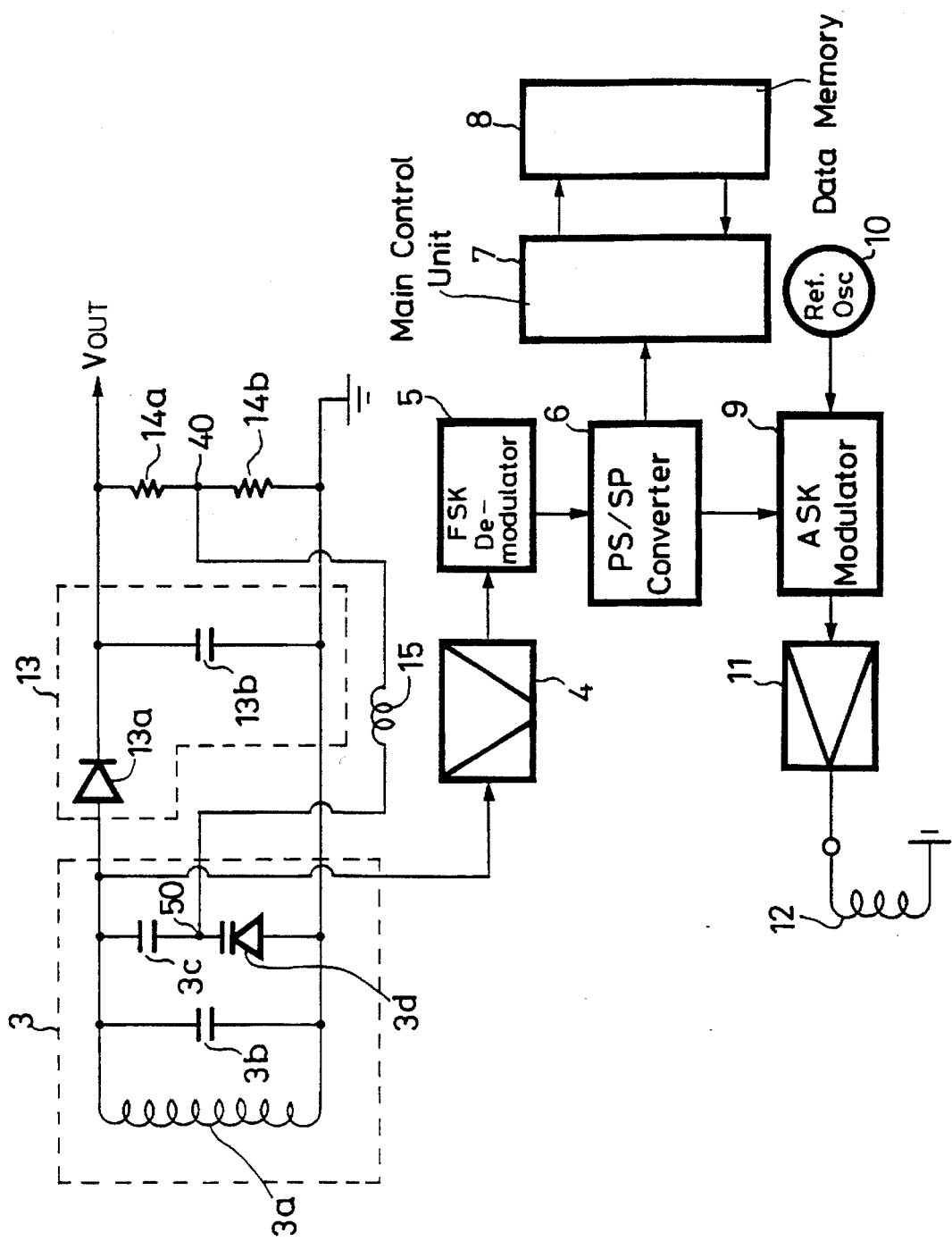
FIG. 2 is a schematic block diagram showing a non-contacting information card according to an embodiment of the present invention.
Figure 3:
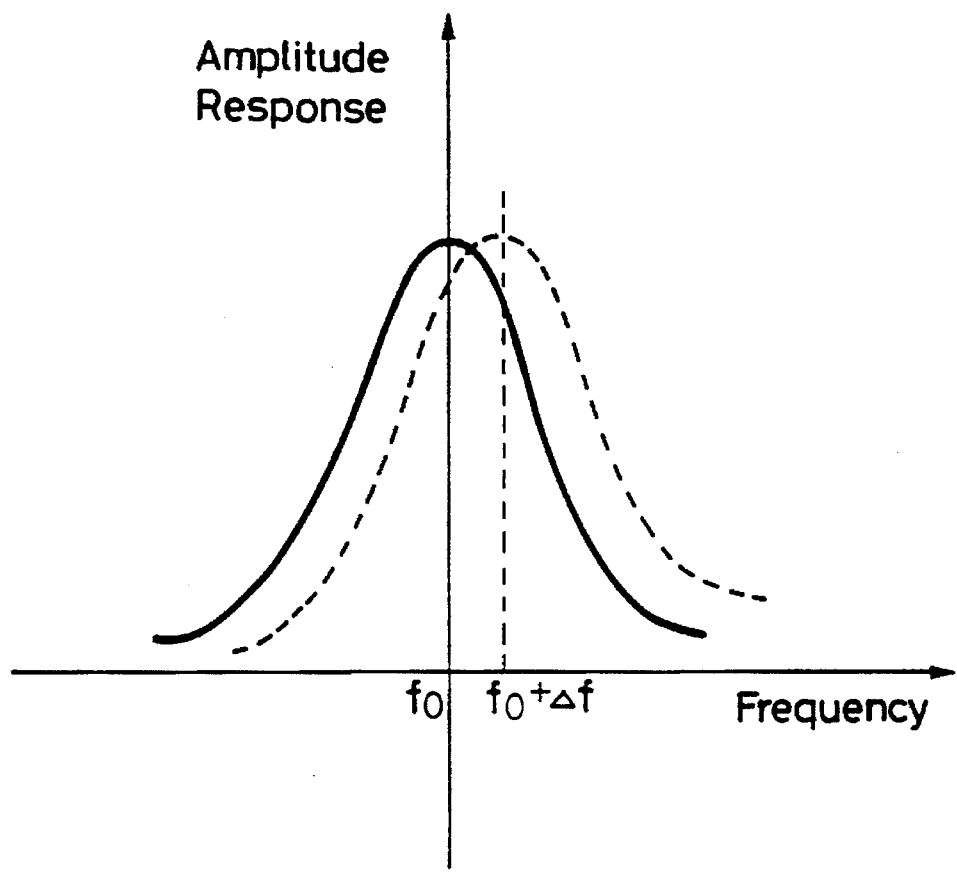
FIG. 3 is a characteristic graph of frequency versus amplitude response and to which references will be made in explaining an operation of the non-contacting information card shown in FIG. 2.

As shown in FIG. 2, there is provided the resonance circuit 3 which receives in an electromagnetic coupling fashion the FSK signal from the coil 32 constructing the write head of the card reader/writer 2 shown in FIG. 1.

As shown in FIG. 2, the resonance circuit 3 is composed of a coil 3a, a capacitor 3b connected in parallel to the coil 3a and a series circuit of a capacitor 3c and a vari-cap diode 3d which constructs a variable capacitive element connected in parallel to the coil 3a.

In this case, the cathode of the vari-cap diode 3d is connected to the capacitor 3c side and a voltage proportional to a power supply voltage, which will be described later on, is supplied to the cathode of the vari-cap diode 3d as a reverse bias voltage.

When the power supply voltage is held at a predetermined value, the resonance frequency $f_0$ of the resonance circuit 3 is selected to be such one that the FSK signal from the coil 32 of the card reader/writer 2 is made maximum by the electromagnetic coupling, e.g., 300 kHz.

In this embodiment, the FSK signal obtained in the resonance circuit 3 is supplied through the bandpass filter 4 to the FSK demodulator 5. An information signal based on the digital signal obtained at the output side of the FSK demodulator 5 is converted in the form of serial-to-parallel data by the PS/SP converter 6 and then supplied to the main control unit 7 formed of the CPU.

The main control unit 7 supplies the data memory 8 with the signals, such as the memory information signal and the read command signal. Therefore, data is written in or read out from the data memory 8 under the control of the main control unit 7.

The digital signal, which is the information signal read out from the data memory 8, is supplied to the main control unit 7. The digital signal, which is the information signal read out from the data memory 8 under the control of the main control unit 7, is converted in the form of parallel-to-serial data by the PS/SP converter 6 and then fed to the ASK modulator 9. The ASK modulator 9 is supplied with the carrier signal having the frequency $f_0$, e.g., 300 kHz from the oscillator 10.

The ASK signal obtained at the output side of the ASK modulator 9 after the information signal has been read out from the data memory 8 is supplied through the amplifier 11 to the coil 12 which transmits the ASK signal to the coil 33 of the read head of the card reader/writer 2 shown in FIG. 1 in an electromagnetic coupling fashion.

According to this embodiment, the FSK signal obtained in the resonance circuit 3 is supplied to the rectifier 13 composed of a rectifier diode 13a and a capacitor 13b. Then, the rectifier 13 generates a DC voltage at the output side thereof as a power supply voltage. This DC voltage is used as an operation voltage to operate the non-contacting information card.

According to this embodiment, a series circuit of resistors 14a and 14b is connected to two ends of the output side of the rectifier 13. A junction 40 between the resistors 14a and 14b is connected through a high frequency blocking coil 15 to a junction 50 between the capacitor 3c and the vari-cap diode 3d constructing the resonance circuit 3.

Further, according to this embodiment, the non-contacting information card transmits and receives in an electromagnetic coupling fashion information between it and a card reader/writer which is similar to the card reader/writer 2 shown in FIG. 1.

Since the non-contacting information card according to this embodiment is arranged as described above, when the non-contacting information card 1 is located at the predetermined position of the operation area of the card reader/writer 2, the rectifier 13 generates a predetermined voltage at its output side. Also, the resonance frequency of the resonance circuit 3 is selected to be the frequency $f_0$ which is determined depending on the capacity value of the initial value of the vari-cap diode 3d. Thus, the electric power is given and received between the non-contacting information card 1 and the card reader/writer 2 at the resonance frequency $f_0$.

If the position of the non-contacting information card 1 is too close to the coil 32 of the card reader/writer 2, then the voltage obtained at the output side of the rectifier 13 increases. However, the vari-cap diode 3d is reversely biased by a voltage corresponding to the increased voltage so that the capacity value of the vari-cap diode 3d decreases in correspondence therewith. As a consequence, the resonance frequency of the resonance circuit 3 increases in the direction shown by a dotted-line characteristic (resonance frequency $f_0+\Delta f$) from a solid-line characteristic (resonance frequency $f_0$) shown in FIG. 3 to shift the resonance characteristic. Therefore, an electromagnetic coupling characteristic of the resonance circuit 3 becomes unsatisfactory and the output voltage of the resonance circuit 3 is lowered. Consequently, the DC voltage obtained at the output side of the rectifier 13 can be made substantially constant regardless of the position between the coil 32 of the card reader/writer 2 and the non-contacting information card 1.

Therefore, according to this embodiment, it is possible to prevent the IC chip or the like disposed in the non-contacting information card from being destroyed by the excess voltage.

While the information signal is transmitted and received between the card reader/writer 2 and the non-contacting information card 1 in a conventional manner, according to this embodiment, the output signal of the resonance circuit 3 is constantly held at a substantially constant level. Therefore, according to this non-contacting information card, the information signal can be received satisfactorily and the signal processing can be carried out satisfactorily.

According to the present invention, the non-contacting information card has a relatively simple arrangement in which the resonance circuit 3 includes a variable capacitive element to prevent the IC chip or the like disposed within the non-contacting information card from being destroyed by the excess voltage.

Furthermore, according to the present invention, since the non-contacting information card is relatively simple in arrangement and does not need a large protecting element, the inventive non-contacting information card can be made inexpensive.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An improved non-contacting information card including a resonance circuit for receiving a carrier signal modulated on the basis of information supplied from a card reader/writer, information processing means for obtaining information from said carrier signal, and rectifier means for rectifying said carrier signal to provide a voltage, said non-contacting information card being operated by said voltage obtained at an output side of said rectifier means, the improvement comprising:

a variable capacitive element connected in said resonance circuit; and voltage feedback means connected to the output side of said rectifier means and to said variable capacitive element, wherein a resonance frequency of said resonance circuit is controlled by varying a capacity value of said variable capacitive element in response to said voltage at the output side of said rectifier means, and said variable capacitive element is formed of a vari-cap diode reversely biased by a connection to said voltage at the output side of said rectifier means, thereby preventing destruction of said non-contacting information card by excess voltage by making said voltage at the output side of said rectifier means substantially constant.

* * * * *